United States Patent [19]

Juodenas

[11] Patent Number: 4,467,372
[45] Date of Patent: Aug. 21, 1984

[54] SIGNAL MONITORING INSTRUMENT

[76] Inventor: George G. Juodenas, Rte. 2, Greenbriar, Tenn. 37073

[21] Appl. No.: 308,040

[22] Filed: Oct. 2, 1981

[51] Int. Cl.³ .............................................. G11B 15/02
[52] U.S. Cl. ....................................... 360/31; 360/25; 360/26
[58] Field of Search ............................ 360/31, 25, 26; 324/79 R, 140 R, 140 D; 328/134

[56] References Cited

U.S. PATENT DOCUMENTS

| | | | |
|---|---|---|---|
| 3,722,353 | 3/1973 | Westhaver | 324/79 R |
| 4,120,229 | 10/1978 | Ora | 324/79 R |
| 4,253,374 | 3/1981 | Watterman | 324/79 R |

Primary Examiner—Vincent P. Canney
Attorney, Agent, or Firm—Luedeka & Neely

[57] ABSTRACT

A signal monitoring instrument (10) includes two input terminals (38) and (40) for receiving two external signals and includes an oscillator output terminal (42). When the instrument is placed in the level mode of operation by depressing a level push button (18) the instrument (10) produces an audible sound having two tones to indicate that a first external signal applied to terminal (38) is not at a desired voltage level. If the frequency difference between the tones is less than a predetermined amount, a beat sound is produced. The absence of two tones and the absence of a beat in the audible sound indicates that the external signal applied to the terminal (38) is at the desired voltage level. When placed in the azimuth mode by depressing the azimuth push button (20), the instrument (10) will produce an audible sound having a frequency inversely proportional to the phase difference between two external signals applied to the two terminals (38) and (40).

21 Claims, 8 Drawing Figures

SIGNAL MONITORING INSTRUMENT

FIELD OF INVENTION

The present invention relates to the field of electrical instruments for monitoring signals and particularly relates to a signal monitoring instrument for monitoring the voltage level of a single output of a tape deck and for monitoring a phase difference between two output signals of a tape deck having identical frequencies.

BACKGROUND OF INVENTION

High quality tape decks such as the ones used in sound studios require frequent adjustments in order to optimize performance. Two of the most common adjustments are adjusting the azimuth of the recording and playback head and adjusting the recording and playback levels. Although these adjustments are necessary on a very frequent basis, preferably before each recording session in a sound studio, these adjustments have required expensive instruments and a relatively high degree of expertise in adjusting tape decks and operating laboratory instruments.

In order to adjust the playback voltage level, the conventional technique is to play a test tape in the tape player. The test tape will have numerous tones recorded on it at a magnetic flux density that should produce a nominal voltage level output. Most tape players have a nominal output voltage of +4 dbm (1.23 volts), but −8 dbm (0.3 volts) and +2 dbm (1 volt) are also common nominal record and play levels for professional recorders. In order to measure these relatively low voltage readings, expensive volt meters are required when performing this adjustment using a conventional technique.

In some professional tape recorders, the recording head may be switched into a playback mode and the test tape may be played back through the recording head. Thus, the record level may be adjusted in the same manner as the playback level. However, in machines that do not have such feature, the record level may be adjusted by using an oscillator to produce an input signal of a selected frequency and voltage level which is recorded by the recording head on a tape and simultaneously played back through the playback head. Assuming the playback level has previously been adjusted, the output from the playback head will indicate the recording level of the tape deck and the record level may be adjusted to an appropriate level by monitoring the playback level. In order to perform this latter adjustment technique, an accurate oscillator must be available to the operator in order to produce the test signal.

The conventional technique for adjusting the azimuth of a playback head is to play a test tape having a manaural recording on the outermost two tracks of the tape. If the azimuth of the head is not properly aligned, the playback output signals from these two outermost tracks will be out of phase. In order to adjust the azimuth of the playback head, the playback output signal from the two outermost tracks are typically monitored on a single oscilloscope using two probes. The azimuth of the playback head is then adjusted until the output signals are phase synchronized.

The conventional technique for adjusting the azimuth of a record head is to input a manaural signal into the tape recorder, record this test signal on the two outermost tracks of a tape and play back these two outermost tracks through the playback head. Assuming that the azimuth of a playback had been previously adjusted, any phase difference between the two playback signals will be caused by the maladjusted azimuth of the record head. Thus, the azimuth of the record head is adjusted until the output playback signals from the two outermost tracks of the tape are synchronized. Again, conventionally, a two probe oscilloscope was necessary in order to monitor the relative phases of the two playback signals from the outermost tracks of the tape.

The primary drawback with the conventional techniques described above is that expensive laboratory equipment is required in order to perform the various adjustments. Also, considerable expertise in operating the test equipment and the tape deck were required in order to perform the adjustments, and most lab instruments have a visual output so that the technician must constantly watch the instruments while he is attempting to adjust the tape deck. When the tape deck's adjustment mechanisms are difficult to access, it is inconvenient for the operator to constantly view his instruments while attempting to adjust the tape deck.

Thus, a need has arisen for a simple and inexpensive instrument for use in adjusting the record and playback levels of a tape deck and for adjusting the azimuth of the recording and playback heads of a tape deck.

SUMMARY OF THE INVENTION

The present invention solves the foregoing and other problems associated with adjusting a tape deck in that an inexpensive instrument is provided for use in adjusting the azimuth of the heads and the recording and playback levels of a tape deck. The instrument of the present invention is inexpensive relative to test equipment presently required to perform such adjustments and it is simple to operate so that a minimum of experience and knowledge is necessary in order to perform the aforementioned adjustments. Furthermore the present invention provides an audible signal to indicate adjustment criteria so that the technician need not view the instrument while adjusting the tape deck.

In accordance with the present invention, a signal monitoring circuit is provided for use in adjusting an external power source to produce an output signal at a preselected output voltage level, where the external power source has an adjustment mechanism for adjusting the voltage level of the output signal thereof.

The signal monitoring instrument has an input for receiving the output signal of the external power source and has a first oscillator connected to the input for producing a first oscillator signal at a frequency that is directly proportional in magnitude to the voltage level of the output signal of the external power source. A reference oscillator produces a reference oscillator signal having a frequency that corresponds to the preselected output voltage level. A mixer mixes the first oscillator signal and the reference oscillator signal to produce a mixed signal, and an audio amp and speaker are responsive to the mixed signal to produce an audible sound corresponding to the mixed signal. The audible sound has a first tone that corresponds to the first oscillator signal and has a second tone that corresponds to the reference oscillator signal. When the first and second tones are sufficiently close in frequency, a beat sound will be producec. In order to adjust the power source, the voltage level of the output signal is varied and the operator listens to the first and second tones. As the voltage level of the output signal of the external power source approaches or moves towards the preselected output voltage, the first and second tones move closer together in frequency, and when the frequency difference between the two tones is less than a predetermined amount, a beat is produced. As the voltage level of the output signal further approaches the desired voltage level, the beat will decrease in frequency. When the voltage level of the output signal reaches the preselected output voltage level that is desired, the beat will disappear or there will be a zero beat, and the first and second tones will have substantially identical frequencies.

The first oscillator may include a rectifier connected to the input to receive the output signal of the external power source for producing a DC signal corresponding in voltage level to the voltage level of the output signal. A voltage controlled oscillator is connected to receive the DC signal and produces the first oscillator signal at a frequency corresponding to the voltage level of the DC signal. A precision DC source produces a reference DC signal that is selectively connected to the rectifier by a calibration switch. An adjustment trim pot is connected to the voltage control oscillator to adjust the frequency of the first oscillator signal. In order to calibrate the signal monitoring instrument, the calibrate switch is actuated to apply the reference DC signal to the rectifier and the adjustment trim pot is adjusted until the first and second tones produced by the speaker are equal in frequency. It is known that the first oscillator signal and the reference oscillator signal are matched in frequency when the first and second tones are equal in frequency and the beat is eliminated from the audible sound produced by the audio amplifier and speaker.

In accordance with another aspect of the present invention, the signal monitoring instrument may further include an output voltage control oscillator for producing an output oscillator signal that is applied to an oscillator output. A second trim pot is provided for adjusting the voltage level of the output oscillator signal of the output voltage controlled oscillator. An oscillator set switch is connected between the output voltage control oscillator and the input of the signal monitoring instrument for selectively applying the output oscillator signal to the input. When the oscillator set switch is actuated to connect the output voltage control oscillator and the input, the output voltage control oscillator may be adjusted to set the voltage level of the output oscillator signal to a preselected voltage level. This adjustement is accomplished by adjusting the voltage level of the output oscillator signal until the first and second tones match in frequency and the audible sound has a zero beat frequency.

As a second indication of a proper adjustment of the external power source to produce the preselected output voltage level, the signal monitoring instrument may include a comparator for comparing the voltage level of the reference DC signal with the voltage level of the DC signal of the rectifier. The comparator produces a comparison signal when the reference DC signal equals the DC signal of the rectifier. An indicator, such as a light or light-emitting diode is connected to the comparator for indicating the presence of a comparison signal, such as by illuminating.

In accordance with another embodiment of the present invention, the signal monitoring circuit may be used to monitor the phase of the first and second external signals. In this mode, the AC power source produces at least first and second external signals having the same frequency and the external power source includes a mechanism for adjusting the relative phases of the first and second external signals. In this embodiment, the instrument includes a second input for receiving the second external signal. A second mixer is connected to the first and second inputs to receive the first and second external signals, respectively, and produces a mixed signal in response thereto. A switch mechanism is provided for disconnecting the first input from the rectifier and for connecting the input of the rectifier to the output of the mixer so that the mixer signal is applied to the rectifier. The switch mechanism also disconnects the reference oscillator signal from the first mixer so that the first mixer produces a signal that is generally identical to the signal produced by the voltage controlled oscillator. In this mode, the audio amplifier and speaker produces a sound having a frequency that is proportional to the voltage level of the second mixed signal, so that the frequency of the sound is proportional to the phase synchronization of the first and second external signals (inversely proportional to the phase difference betwen the first and second external signals). Thus, to synchronize the first and second external signals, the relative phase of the two signals is adjusted until the frequency of the audio sound is maximized.

In the above described signal monitoring instruments, it will be understood that the power source in the preferred embodiment is a tape deck and that the external signals are the playback output signals of the tape deck. When the instrument is placed in a mode for monitoring the voltage level of one external signal, it may be used to adjust the recording and/or playback voltage levels, and when the instrument is placed in a mode for measuring the relative phase difference between two external signals, the instrument may be used to monitor two playback signals to adjust the azimuth of either a playback or a record head. These particular applications of the present invention are described in the following Detailed Description.

BRIEF DESCRIPTION OF THE DRAWING

The present invention may best be understood by reference to the Detailed Description of the preferred embodiment when considered in conjunction with the accompanying Drawings in which.

DETAILED DESCRIPTION

Figure 1:
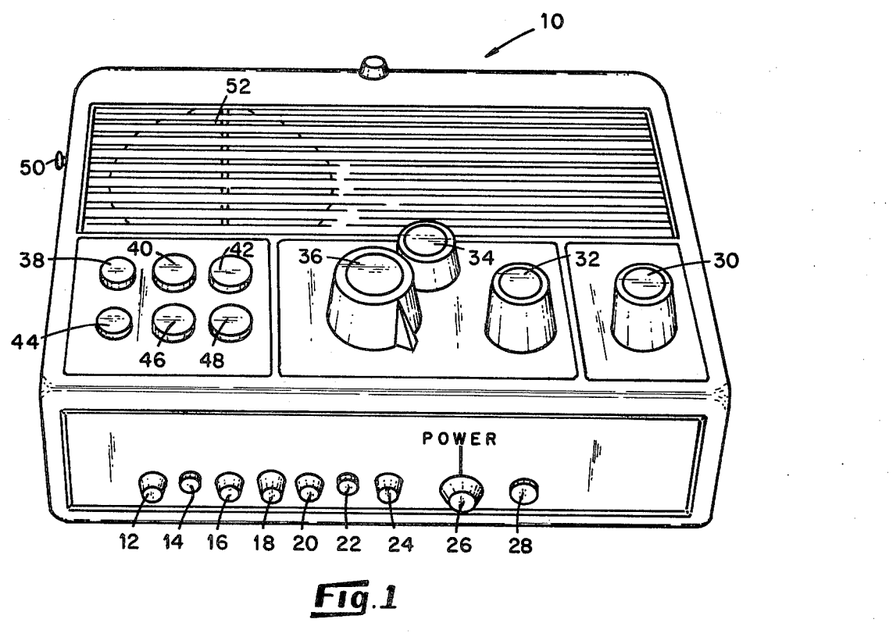
FIG. 1 is a perspective view of the signal monitoring instrument of the present invention.

Referring now to the drawings in which like reference characters designate like or corresponding parts throughout the several views, there is shown in FIG. 1 a signal monitoring instrument 10 embodying the present invention. On the front vertical surface of the instrument 10 there is a first group of push buttons 12, 14 and 16 that are mechanically interconnected so that only one of these three buttons may be pushed at any one time. There is also a second group of push buttons 18, 20, 22 and 24 that are likewise grouped so that only one of these four push buttons may be depressed at any one time. A push button 26 on the vertical face of the instrument 10 is a power button that merely serves as an on/off switch for the instrument. A light omitting diode 28 is positioned adjacent push button 26 and will illuminate to indicate that the power to the instrument is on.

Four rotatable knobs 30, 32, 34 and 36 are mounted on the upper surface of the oscillator 10. Knobs 30, 32 and 36 control internal variable resistors or trim pots, and knob 34 controls a multiple pole switch for selecting one of several internal capacitors as will hereinafter be described in greater detail. The upper surface of the instrument 10 further includes input terminals 38 and 40 and output oscillator terminal 42 and corresponding common terminals 44, 46 and 48. A calibrate screw 50 is positioned on the left vertical surface of the instrument 10 and controls the frequency of an oscillator that will be described hereinafter, and speaker 52 is mounted beneath the upper surface of the instrument 10. A light omitting diode 54 is mounted on the upper rear edge of the instrument 10.

Referring again to the front vertical surface of the instrument 10, the push buttons 12, 14 and 16 modify input circuitry so that the instrument 10 may be used with tape recorders having varying nominal playback and record voltage levels. Push button 12 is depressed when a tape recorder is used having a negative 8 dbm change throughout nominal voltage. Button 14 is depressed when a recorder is used having a plus four dbm nominal voltage. And, button 16 is depressed when a recorder is used having a plus two dbm nominal voltage.

Push buttons 18, 20, 22 and 24 control the function of the instrument. Button 18 is depressed when it is depressed to use instrument 10 to monitor the record or playback level of a tape recorder. Button 20 is depressed when instrument 10 is to be used to adjust the azimuth of the tape heads of a tape recorder. Button 22 is depressed to apply an internal oscillator signal to the input 38. And, button 24 is depressed when it is desired to calibrate the instrument 10 using the calibration screw 50.

Knob 30 controls the volume or loudness of the speaker 52, and knob 32 controls the voltage level of the oscillator signal that is generated by the instrument 10 and in output on terminal 42. Knobs 34 and 36 control the frequency of the oscillator signal with knob 34 being rotatable through four set positions to vary the frequency of the oscillator by a factor of 10 between each position. Knob 34 may be set so that the frequency range of the oscillator signal is from 10 to 100 hertz, from 100 to 1000 hertz, from 1 kilohertzs to 10 kilohertz and from 10 kilohertz to 100 kilohertz. Knob 36 may be rotated to an infinity of positions between 1 and 10 to multiply the frequency of the oscillator signal by a factor of between 1 and 10. Thus, knob 36 may be rotated to adjust the exact frequency of the oscillator signal within the range set by knob 34.

Before using instrument 10, it must first be calibrated. To perform this function, button 24 is depressed and knob 30 is adjusted until the speaker produces an audible sound. Assuming that the instrument is grossly out of calibration, two distinct tones will be produced by the speaker 52. To calibrate instrument 10, the calibration screw 50 is rotated in the direction that causes the tones to grow closer in frequency. As the calibration screw 50 is adjusted, the frequency of the two tones will approach one another until at a predetermined frequency difference between the tones, a beat frequency will be heard. As the calibration screw 50 is further turned towards the proper calibration point, the beat frequency will decrease and will eventually become zero indicating that the two tones previously produced by speaker 52 have the same frequency. At this point, the instrument 10 is calibrated.

To operate instrument 10 in a mode to monitor and adjust the playback level of a tape deck, level button 18 is depressed and one of buttons 12, 14 or 16 is depressed according to the nominal output voltage of the particular tape recorder being monitored. Assuming that the tape recorder being monitored has a nominal voltage level of 4 dbm, button 14 should be depressed.

The playback signal of the tape recorder is applied to terminal 38 and the speaker button 30 is adjusted until an audible sound is produced by the speaker 52. Assuming the playback level of the tape deck is substantially out of adjustment, two tones will be heard over the speaker 52, one corresponding to a reference oscillator signal and another corresponding to the voltage level of the playback signal. As the voltage level of the recorder is adjusted, the two tones will approach one another in frequency and when such tones are within a predetermined frequency range, a beat sound will be heard. The volage level of the playback signal is adjusted until the two tones have the same frequency and the beat frequency goes to zero. At this point, the playback level of the tape deck has been adjusted to produce the proper nominal output level voltage. This identical procedure should be repeated for various frequency levels. As has been previously described, the playback level on the tape deck is adjusted while playing a test tape. In some tape decks, the record head may be monitored and operated as a play head, and the above described techniques may be used to adjust the record level by operating the record head as a playback head. However, in tape decks where the record head cannot be switched to function as a play head, a separate technique must be used to adjust the record level of tape deck.

In adjusting such record levels, the output oscillator signal appearing at terminal 42 is used as test signal. First, the output oscillator signal is pre-set to a desired voltage level by first depressing the oscillator button 22. In this mode, the output oscillator signal is supplied to the input terminal 38. Assuming the voltage level of the output oscillator signal is grossly out of adjustment, two audibles tones will be heard over the speaker 52. The voltage level of the output oscillator signal is adjusted using knob 32, and as the voltage level of the output oscillator signal approaches a pre-selected voltage level, the two tones produced by speaker 52 will approach each other in frequency, will begin to produce a beat frequency, and the beat frequency will eventually reach zero when the output oscillator signal is adjusted to the proper voltage level.

After the oscillator has been adjusted or calibrated to produce the desired voltage level, the level switch 18 is again depressed and the oscillator signal is applied from terminals 42 and 48 to the input of the tape deck. The tape deck then records the output oscillator signal on magnetic tape using the record head and plays the output oscillator signal back over the play head. The playback signal is applied to input terminals 38 and common terminal 44, and assuming that the playback level of the tape deck has been previously adjusted, any error in the voltage level of the playback signal may be attributed to an error in the recording level. Thus, the recording level of the tape recorder is adjusted until the playback signal is produced at the proper voltage level, in this case 4 dbm. That is, the record level is adjusted until the two tones produced by speaker 52 have the same frequency and the beat frequency produced by the interaction of the two tones goes to zero.

The instrument 10 may also be used to adjust the azimuth of the tape deck heads. In order to adjust the azimuth of the playback head, the azimuth button 20 is depressed, and a monaural test tape is placed in the tape recorder. The two playback signals produced by the outermost tracts of the test tape are inputed into input terminals 38 (using a common terminal 44) and input 40 (using the common terminal 46). In response to the two playback signals applied to terminals 38 and 40, the speaker 52 will produce a single audible tone having a frequency that is inversely proportional to the phase difference or shift between the two playback signals applied to input terminals 38 and 40. Thus, the azimuth of the playback head is adjusted until the audible sound produced by the speaker 52 has a maximized frequency. When the frequency of the audible tone produced by speaker 52 is mazimized, the playback is at the proper azimuth position.

To adjust the azimuth of the record head of a tape deck, it is necessary to input the oscillator signal from terminal 42 (and common 48) to the input of the tape recorder and record the oscillator signal on the outermost tracks of the multitrack tape. This tape is then played back over the playback head through the tape player outputs. Assuming the azimuth of the playback head has been previously adjusted, any phase errors or shifts between the two playback signals from the two outermost tracks of the tape may be attributed to errors in the positioning of the record head. As when adjusting the azimuth of the playback head, the two output signals from the tape recorder are applied to input terminals 38 and 44. The speaker 52 produces an audible sound in response to the two playback signals at input terminals 38 and 40, and the azimuth of the record head is adjusted until the frequency of the audible sound from speaker 52 is maximized.

The LED 54 is a second indicator that operates when the level switch 18 is depressed. LED 54 will be illuminated when a signal, such a tape recorder playback signal, is applied to terminal 38 at the preselected voltage level (−8 dbm, 4 dbm or 2 dbm). If the tones produced by the speaker 52 achieve equal frequencies and the beat frequency goes to zero, but the LED 54 does not illuminate, it is an indication that instrument 10 is out of calibration.

Figure 2A:
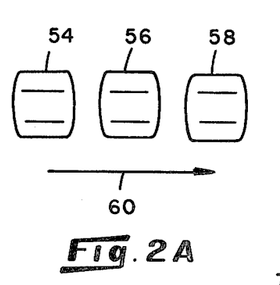
FIGS. 2A and 2B are diagramatical views showing three tape heads of a tape recorder.
Figure 2B:
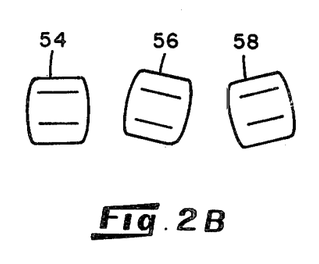

Although the tape heads referred to in the above discussion are conventional and in and of themselves are not considered an element of the invention, a brief discussion of head azimuth alignment is provided below. Referring now to FIGS. 2A and 2B, there is diagrammatically shown tape heads 54, 56 and 58 of a tape player. Head 54 is an erase head, head 56 is a record head, and head 58 is a playback head. The magnetic tape moves across the heads in the direction of arrow 60. In FIG. 2A, all three heads 54, 56 and 58 are shown having a correct azimuth positioning. In FIG. 2B, the erase head 54 has a properly adjusted azimuth but the record head 56 and the playback head 58 have incorrect azimuths. Referring to heads 56 and 58 in FIG. 2B, it will be appreciated that a tape moving across these heads will be recording at laterally shifted positions on the outermost tracks and will be playing the tape at laterally shifted positions at the outermost track. When therecord and playback heads 56 and 58 are out of alignment as shown in FIG. 2B, high frequencies will not record or play on a magnetic tape.

Figure 3:
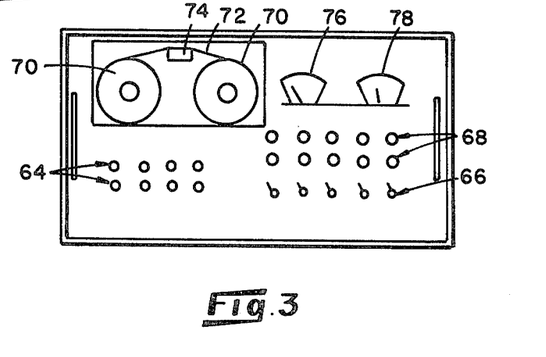
FIG. 3 is a diagramatical representation of a generalized tape deck.

Although the tape decks previously referred to are conventional and in and of themselves are not considered an element of the invention, a brief description of a typical tape deck is provided below. Referring now to FIG. 3 there is shown a generalized diagram of a tape deck 62 that may be adjusted using the instrument 10 of the present invention. The tape deck 62 includes a plurality of input and output terminals 64 that may be interconnected with the input terminals 38 and 40 and the oscillator terminal 42 of the instrument 10 to transmit the output oscillator signal from the instrument 10 to the deck 62 and to transmit playback signals or other signals from the deck 62 to instrument 10. Switches 66 on the tape deck 22 are used to switch the player into the various conventional modes of operation, and knobs 68 are used to adjust the performance of the tape deck 62, such as adjusting the record level and the playback level of the tape deck 62. Reels 70 of magnetic tape 72 are mounted on the tape deck 62 and threaded through the tape head 74. The tape head 74 includes one or more heads for recording, playing or erasing as shown in FIGS. 2A and 2B, and includes adjustment screws (not shown) for adjusting the azimuth of such heads.

Meters 76 and 78 are provided on the tape deck 62 to monitor the record level and playback level of the tape deck 62. These meters 26 and 28 may also be adjusted using the instrument 10 of the present invention. When the output of a particular track or channel of the tape recorder 62 has been adjusted to produce the nominal output voltage while playing a test tape, the meters 76 and 78 should be adjusted to indicate a zero output.

Figure 4:
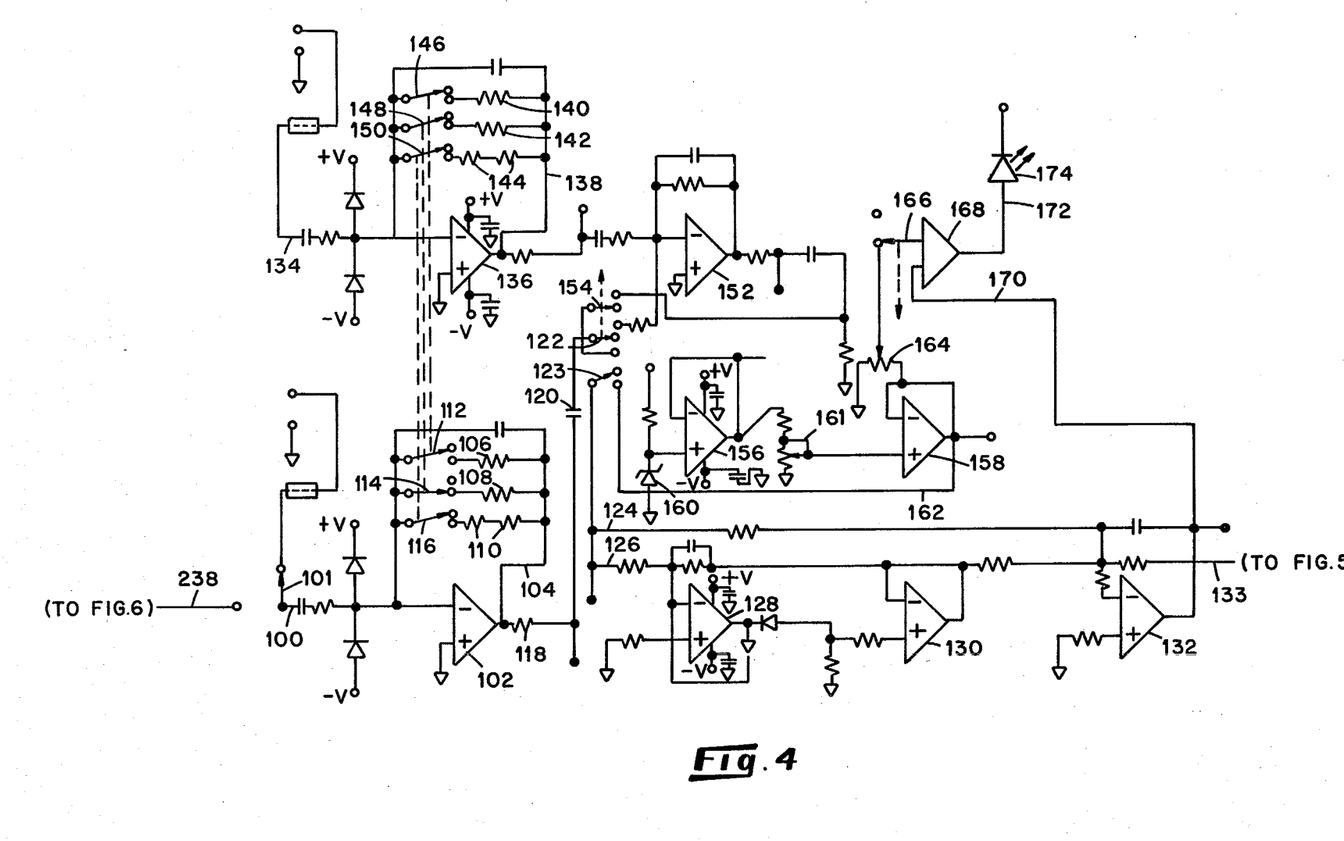
FIG. 4 is a circuit diagram of two inputs of the instrument, a mix amp, a rectifier, a precision DC source, and a comparator.

Referring now to FIG. 4, there is shown a circuit diagram of the inputs of the instrument 10, a mix amp, a precision DC source, a rectifier, and a comparator. As shown in FIGS. 4, 5, 6, 7 and 8, the circuit is in a position as if the level button 18 (FIG. 1) is depressed and the +4 dbm button 14 (FIG. 1) is depressed. A line 100 is connected to input 38 (FIG. 1) and is connected through a switch 101 to the input of an op amp 102 and switch 101 is actuated by the oscillator button 22 (FIG. 1). All op amps shown in FIGS. 4-8 are manufactured by Texas Instruments and op amp 102 is model no. IC-403. The gain of op amp 102 is determined by a feedback loop that includes line 104 and resistors 106, 108 and 110 which are connected back to input of op amp 102 through switches 112, 114 or 116, respectively. Switch 112 is actuated by push button 12, switch 114 is actuated by push button 14, and switch 116 is actuated by switch 16.

The output of op amp 102 is applied through a resistor 118 and a capacitor 120 to a switch 122 that is actuated by the azimuth push button 20. The output of the op amp 102 is further applied to switch 123 that is actuated by the calibrate push button 24. From switch 123, the output of op amp 122 is applied to lines 124 and 126.

Op amps 128, 130 and 132 (model nos. IC-601, IC-602 and IC-603) form a rectifier for rectifying the signal applying on lines 124 and 126. A rectified signal appears on line 133 that has a DC voltage level corresponding to the RMS or DC voltage level appearing on lines 124 and 126.

The second input terminal 40 (FIG. 1) is connected to line 134 which is operable to apply an input signal to the input of op amp 136 (IC-401). The gain of op amp 136 is determined by a feedback loop that includes line 138 and resistors 140, 142 or 144 which are connected back to input of op amp 136 through switches 146, 148 or 150. Switch 146 is actuated by push button 12. Switch 148 is actuated by push button 14 and switch 150 is actuated by push button 16. The function of the feedback loops on op amps 102 and 136 is to match the instrument 10 to different tape recorders. When switches 148 and 114 are closed as shown in FIG. 4, the op amps 102 and 136 have a unity gain so that +4 dbm appearing at the inputs of these op amps will also appear at the output of the op amps. When switches 112 and 146 are closed, op amps 102 and 136 will have a gain such that a −8 dbm appearing at the input of the op amps will produce a +4 dbm at the outputs thereof. When switches 116 and 150 are closed, a +2 dbm appearing at the input lines 100 and 134 will produce a +4 dbm at the outputs of op amps 102 and 136.

The output of op amp 136 is applied to the input of a mix amp 152 (IC-402). The input of the mix amp 152 is also connected to switch 122 so that when the azimuth push button 20 depressed the input signal appearing on terminal 38 will be applied through the op amp 102 to mix amp 152. The output of the mix amp 152 is applied to a switch 154 that is also actuated by the azimuth push button 20. When the azimuth push button 20 is depressed, switch 154 connects the output of mix amp 152 to switch 123 that transmits the output of the mix amp 152 to the rectifier circuit formed by op amps 128, 130 and 132. Thus, when the azimuth push button 20 is depressed, a DC voltage will be produced at line 133 that corresponds in magnitude to the output of mix amp 152.

Op amps 156 and 158 (IC-501 and IC-502) and their related circuitry function as a precision DC source. The voltage level of the output of op amp 156 is controlled by the zener diode 160 which provides a stable reference voltage to produce a stable DC reference signal. Thus, the precision DC reference signal appears on line 162. The voltage magnitude of the precision DC reference signal is controlled by a trim pot 161 that is pre-set at the factory.

When the calibrate push button is depressed, switch 123 will connect line 162 and the precision DC reference signal to lines 124 and 126 so that rectified signal appearing on line 133 will correspond precisely to the precision DC reference signal appearing on line 162. The precision DC reference signal is also applied through a trim pot 164 and a switch 166 to one input of a comparitor 68 (IC-12). Switch 166 is actuated by the azimuth push button 20 so that the comparator is cut out of the circuit when the azimuth push button 20 is depressed. The other input of the comparator is connected by line 170 to receive the rectified signal appearing at the output of op amp 132.

The output of the comparator 168 is connected through line 172 to a light emitted diode 174. When the rectified signal appearing at the output of op amp 132 is equal to the precision DC reference signal, the comparator 168 illuminates the light emittng diode 174. The trim pot 164 is provided for adjusting the exact point at which the comparator 168 illuminates the diode 174.

Trim pot 164 is set at the factory and is not accessible by the operator.

Figure 5:
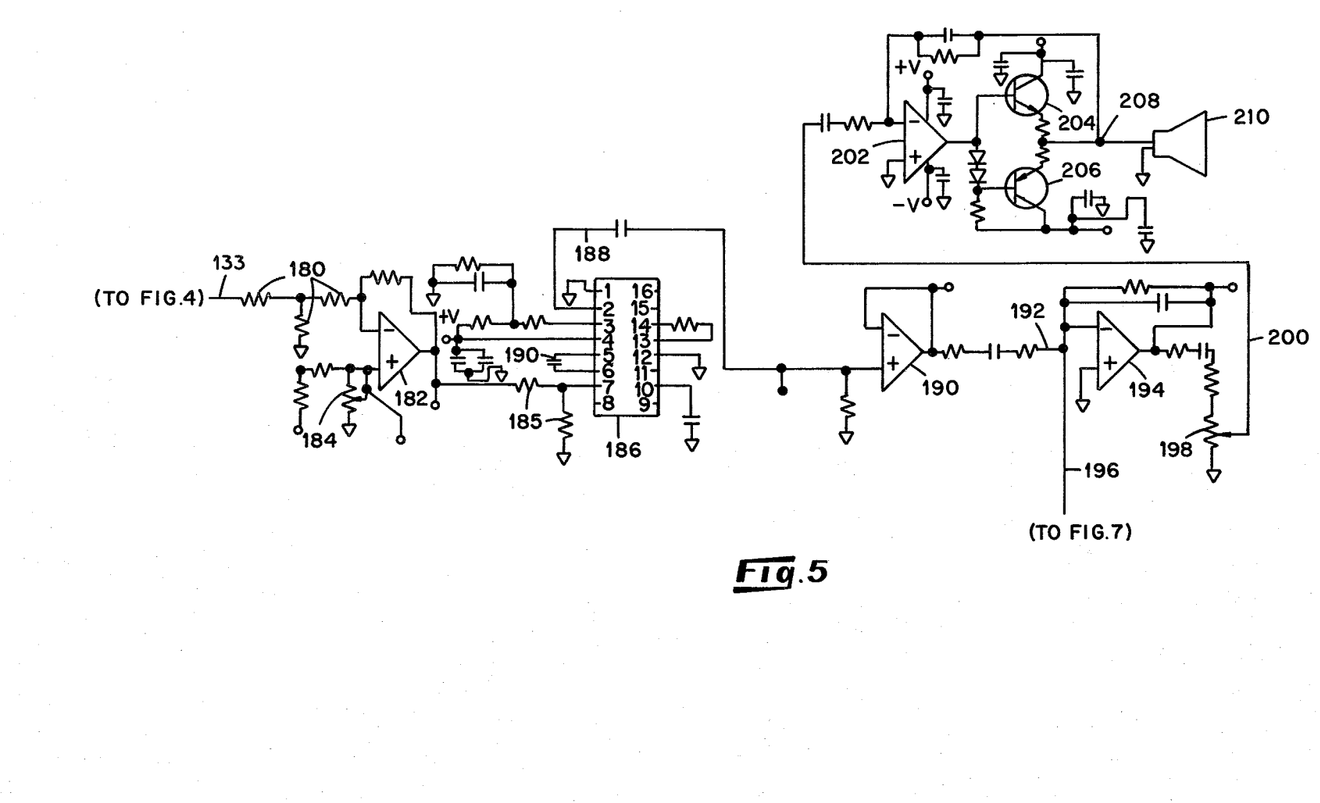
FIG. 5 is a circuit diagram of a voltage controlled oscillator providing one input to a mix amp that drives a power amp and speaker.

Referrng now to FIG. 5, there is shown a voltage controlled oscillator driving a mix amp, a power amp and a speaker. The rectified signal appears at line 133 and is applied through a resister network 180 to the input of an op amp 182 (IC-604). The positive input of the op amp 182 is connected through a trim pot 184 that functions to place a variable voltage on this positive input of op amp 182. Trim pot 184 is connected to calibrate screw 50 shown in FIG. 1. By adjusting trim pot 184, the output of op amp 182 is varied or adjusted. The output of op amp 182 is applied through a voltage divider 185 to pin 7 of a voltage controlled oscillator 186 (IC-2) (manufactured by Exar). The output of the voltage controlled occillator 186 appears at line 188 (pin 2 of the voltage control oscillator 186). By adjusting trim pot 184 the output of op amp 182 is adjusted which adjusts the frequency of the voltage controlled oscillator appearing on line 188.

The frequency range of the voltage controlled oscillator 186 is determined by a capacitor 190 that is connected between pins 5 and 6 of the oscillator. The resister network connected to pins 3 and 4 of the oscillator 186 controls the voltage level of the oscillator signal appearing on line 188.

The output of the oscillator 186 is applied through a buffer amplifier 190 to the input 192 of a mix amp 194. A reference oscillator signal is also applied through line 196 to the input of the mix amp 94. The output of mix amp 194 is applied through a variable resister 198 and line 200 to the input of an op amp 202 (IC-9). The output of op amp 202 is applied to power transistors 204 and 206. Op amp 202, transistors 204 and 206, and the related circuitry form a power audio amplifier whose output appears on line 208 and drives a speaker 210. The variable resister 198 is controlled by knob 30 shown in FIG. 1 and controls the volume or loudness of the speaker 210.

Figure 6:
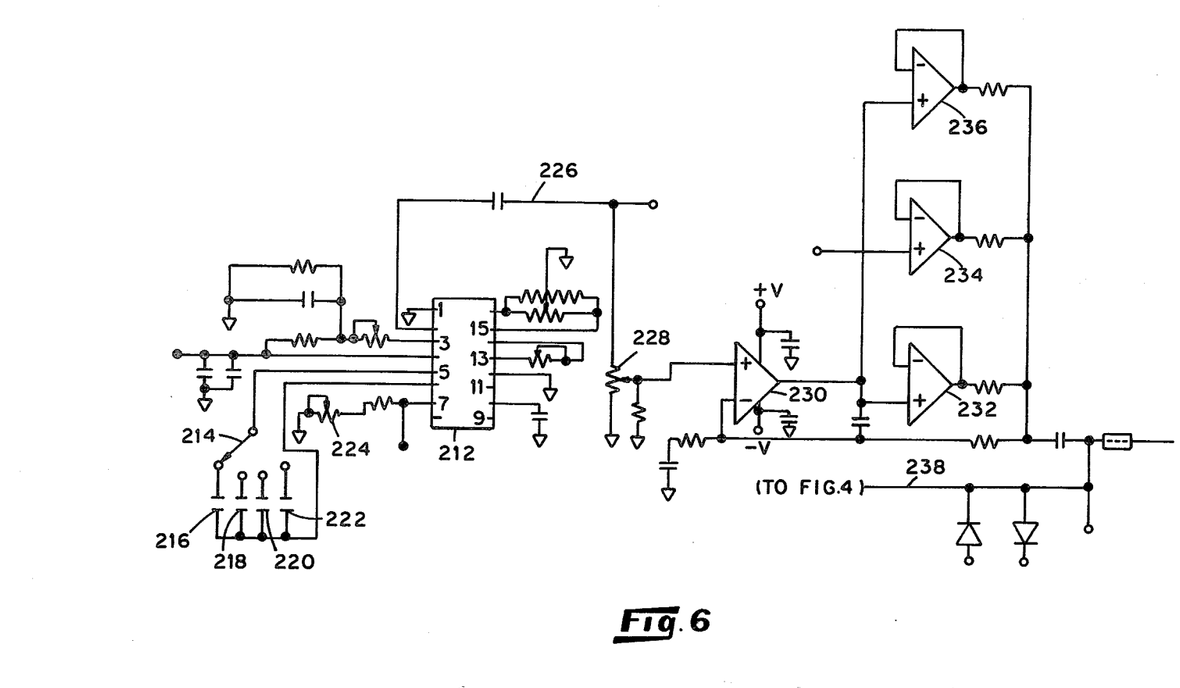
FIG. 6 is a circuit diagram of an output voltage controlled oscillator of the instrument and a line amp.

Referring now to FIG. 6, there is shown a voltage controlled oscillator 212 (IC-1) having pins 5 and 6 thereof connected through a switch 214 to one of four capacitors 216, 218, 220 or 222. Switch 214 is a four position switch that is controlled by knob 34 shown in FIG. 1. Pins 5 and 6 control the frequency range of VCO 212 and by switching through switch 214 between the capacitors 216, 218, 220, and 222, the frequency range of the VCO 212 is varied. The output frequency of the VCO 212 is also variable within the range set by switch 214. A variable resister 224 is connected between common and pin 7 of the voltage control oscillator 212 to vary the frequency output of the VCO 212 within the preselected range set by switch 214. The output of voltage control oscillator 212 is applied through line 226 to a potentiometer 228. The position of the potentiometer 228 is controlled by knob 32 shown in FIG. 1 and controls the voltage level of the output oscillator signal of the voltage control oscillator 212. The op amps 230, 232, 233 and 236 (IC-801, IC-802, IC-803 and IC-804) and their related circuitry form a line amp for amplifying and transmitting the output oscillator signal from the voltage controlled oscillator 212 to line 238. Line 238 is connected to switch 101 which is actuated by the oscillator button 22. When button 22 is depressed the output oscillator signal on line 238 is applied to the input of op amp 102.

Figure 7:
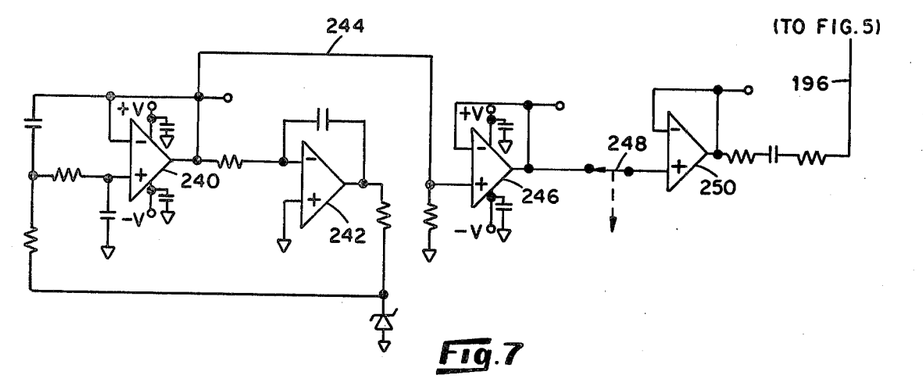
FIG. 7 is a circuit diagram of a reference oscillator.

Referring now to FIG. 7, there is shown an oscillator for producing a reference oscillator signal. The op amps 240 and 242 and the circuitry interconnecting them as shown in FIG. 7 is a conventional oscillator that produces a reference oscillator signal on line 244. Line 244 is connected to the input of op amp 246 which functions as a buffer. The output of op amp 246 is connected through a switch 248 to the input of op amp 250 which also functions as a buffer. Switch 248 is actuated by the azimuth push button 20 so that the reference oscillator signal appearing on line 244 will be transmitted to line 196 through the buffer amps 246 and 250 when the azimuth push button is not depressed. When the azimuth button 20 is depressed, the reference oscillator signal will not appear on line 196.

Figure 8:
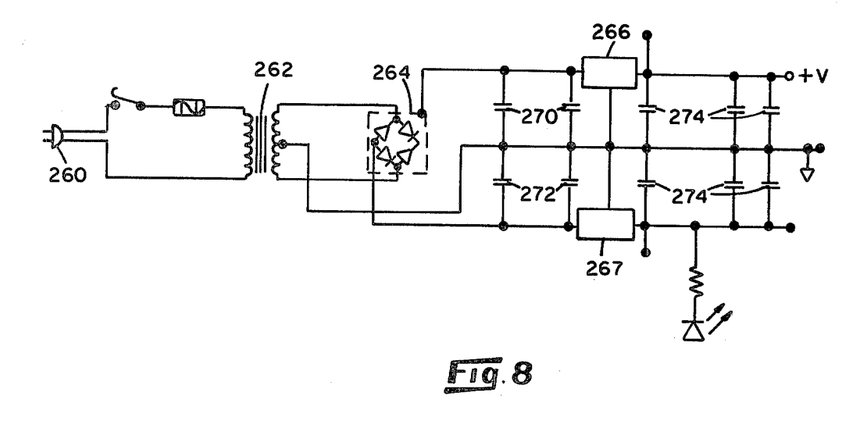
FIG. 8 is a circuit diagram of a power supply.

Referring now to FIG. 8, there is shown a conventional power supply for providing power to circuitry shown in FIGS. 4, 5, 6 and 7. The power supply includes a plug 260 for being connected to a AC power source. The plug 260 supplies power to a transformer 262 that is interconnected with a rectifier circuit 264. The output of the rectifier circuit 264 is applied to regulators 266 and 268 (Motorola 7915). Capacitors 270 and 272 are provided to perform a filter function, and capacitors 274 and distributed capacitors that function to eliminate noise.

Having described the circuitry of FIGS. 4, 5, 6, 7 and 8 with reference to the controls shown in FIG. 1, the operations of such circuitry may be easily understood. When the calibrate button 24 is depressed, the precision DC reference signal appearing on line 162 is applied through switch 163 to lines 126 and 124 so that the rectified signal appearing at line 133 is the precision DC reference signal. The precision DC reference signal has a voltage level of 4 dbm and, using trim pot 164, the frequency of the output signal from the voltage controlled oscillator 186 is adjusted so that it is equal to the frequency of the reference oscillator signal appearing on line 196. When the reference oscillator signal and the output signal of the voltage control oscillator 186 are equal, the output of mixer 194 will produce a single tone and speaker 210 will produce an audible sound having a single tone or frequency and having no beats.

When the oscillator push button 22 is depressed, switch 101 is disconnected from line 100 and connected to line 238 (FIG. 7). Using the potentiometer 228, the voltage level of the signal appearing on line 238 may be adjusted to the appropriate nominal level, in this case 4 dbm. The signal appearing on line 238 is applied through op amp 102, through switch 122, through switch 123, to lines 124 and 126 and rectified so that the rectified signal appearing at line 133 corresponds in voltage level to the output oscillator signal appearing on line 238. The rectified signal appearing on line 133 controls the frequency of the output signal of voltage control oscillator 186 which is mixed with the reference oscillator signal appearing on line 196 by the mix amp 194. Since the speaker 210 produces a signal corresponding to the output of the mix amp 194, by adjusting potentiometer 228, the sound produced by speaker 210 may be adjusted using trim pot 228 to eliminate the beat frequency and produce one tone instead of two. In this manner, the signal appearing on line 238 is adjusted to a desired voltage level.

When the azimuth push button 20 is depressed, switches 122 and 154 are actuated so that the outputs of op amps 102 and 136 are applied to the input of the mix amp 152 whose output is applied to lines 124 and 126 to produce a rectified signal on line 133. As usual, the rectified signal at line 133 controls the voltage control oscillator 186 whose output signal is applied through op amp to mixer 194. However, since the azimuth push button 20 disconnected switch 238 no signal appears on line 196 and a single tone is produced at the speaker 210 having a frequency inversely proportional to the phase difference of the signals appearing at the inputs of op amps 102 and 136.

When the level button 18 is depressed, the circuit appears as it is shown in FIGS. 4, 5, 6 and 7 as previously described. The rectified signal appearing at line 133 will be proportional to the input signal applied on line 100. If the signal applied on line 10 is not at the desired RMS voltage level (4 dbm), the frequency of the voltage control oscillator 186 will not match the frequency of the reference oscillator signal on line 196 and two tones will be produced by the speaker 210. If the tones are sufficiently close in frequency, and audible beat will be produced by the speaker 210. When the input signal on line 100 is adjusted to the proper voltage level (4 dbm in this case) the two tones will have the same frequency and the best frequency will be zero.

Although a particular embodiment of the present invention has been described in foregoing Detailed Description, it will understood that the invention is capable of numerous rearrangements, modifications and substitutions of parts without departing from the spirit of the invention.

I claim:

1. A signal monitoring circuit for use in adjusting an external power source to produce a preselected output voltage level, the external power source having an adjustment mechanism for adjusting the voltage level of the output signal thereof, comprising:

an input for receiving the output signal of the external power source;

first oscillator means connected to said input for producing a first oscillator signal having a frequency that is directly proportional in magnitude to the voltage level of the output signal of the external power source;

reference oscillator means for producing a reference oscillator signal having a frequency that is equal to the first oscillator signal when the output signal applied to said input is at a preselected reference voltage level;

mixer means for receiving and mixing the first oscillator signal and the reference oscillator signal to produce a mixed signal;

audio means responsive to the mixed signal for producing an audible sound corresponding to the first oscillator signal and the reference oscillator signal so that the audible sound will include first and second tones that will produce a beat sound when the first and second tones are within a predetermined frequency range, the beat sound having a frequency that is proportional to the frequency difference between the first and second tones so that the voltage level of the output signal may be adjusted to correspond to the preselcted output voltage level by adjusting the output voltage level of the external power source so that the beat sound has a zero frequency.

2. The signal monitoring circuit of claim 1 wherein said first oscillating means comprises:

a rectifier connected to said input to receive the output signal of the external power source for producing a DC signal corresponding in voltage level to the voltage level of the output signal; and a voltage controlled oscillator connected to receive the DC signal of said rectifier to produce the first oscillator signal at a frequency corresponding to the voltage level of the DC signal.

3. The signal monitoring circuit of claim 2 further comprising:
an output voltage controlled oscillator for producing an output oscillator signal;
an oscillator output for receiving and outputting the output oscillator signal;
output adjustment means for adjusting the voltage level of the output oscillator signal; and
an oscillator set switch connected between said output voltage controlled oscillator and said input for selectively applying the output oscillator signal to said input so that the output adjustment means may be adjusted to set the voltage level of the output oscillator signal to a preselected voltage level by adjusting the output oscillator signal voltage level until the first and second tones have the same frequency and the beat sound of the audible signal is eliminated.

4. The signal monitoring circuit of claim 2 wherein said first oscillating means further comprises:
a precision DC volt source for producing a reference DC signal;
a calibrate switch for selectively connecting the precision DC source to the rectifier to apply the reference DC signal thereto; and
voltage controlled oscillator adjustment means for adjusting the frequency of the first oscillator signal produced by the voltage controlled oscillator so that the signal monitoring circuit may be calibrated by applying the reference DC signal through said calibrate switch to said rectifier and adjusting the frequency of the first oscillator signal using the voltage controlled oscillator adjustment means to match the frequencies of the first and second tones to eliminate the beat sound in the audio signal and, thus, to adjust the frequency of the first oscillator signal to match the frequency of the reference oscillator signal.

5. The signal monitoring circuit of claim 4 further comprising:
a comparator for comparing the voltage level of the reference DC signal with the voltage level of the DC signal of said rectifier and for producing a comparison signal when the reference DC signal equals the DC signal of said rectifier; and
an indicator connected to said comparator for indicating the presence of a comparison signal.

6. A signal monitoring circuit for use in adjusting an external AC power source that produces at least first and second external signals having the same frequency, the AC power source including a mechanism for adjusting the relative phases of the first and second external signals, comprising:
a first input for receiving the first external signal;
a second input for receiving the second external signal;
a mixer connected to said first and second inputs for receiving and mixing the first and second external signals to produce a mixed signal;
audio means responsive to the mixed signal to produce an audible sound having a frequency that is proportional to the RMS voltage level of said mixed signal, so that said first and second external signals may be phase synchronized by adjusting the relative phases of said first and second external signals until the frequency of the audio sound is maximized.

7. The signal monitoring circuit of claim 6 wherein said audio means comprises:
a rectifier for rectifying the mixed signal and for producing a rectified signal having a DC voltage level corresponding to the RMS voltage level of the mixed signal;
a voltage controlled oscillator for receiving the rectified signal and for producing an oscillator signal having a frequency that is proportional to the voltage level of the rectified signal;
speaker means responsive to the oscillator signal for producing a tone having a frequency that is proportional to the voltage level of the rectified signal.

8. A method for adjusting the voltage level of an external signal to a desired voltage level where the external signal is produced by an external power source having an adjustment mechanism for adjusting the voltage level of the external signal, comprising:
producing a first signal having a frequency corresponding to the voltage level of the external signal;
producing a second signal having a frequency that corresponds to the desired voltage level;
comparing the first and second signals and producing a comparison signal indicating the frequency difference between the first and second signals; and
adjusting the voltage level of the external signal to a voltage level that cuases the comparison signal to indicate a zero detectable frequency difference between the first and second signals.

9. The method of claim 8 wherein the step of producing a first signal comprises:
rectifying the external signal and producing a DC rectified signal corresponding in voltage level to the voltage level of the external signal; and
producing the first signal to have a frequency corresponding to the voltage level of the DC rectified signal.

10. The method of claim 9 further comprising the step of:
calibrating the step of producing the first signal by the following steps:
producing a precision DC reference signal having a desired voltage level;
producing an intermediate DC signal having a voltage level corresponding to the voltage level of the DC reference signal; and
adjusting the voltage level of the intermediate DC signal to produce the DC rectified signal at a voltage level that causes the production of the first signal at a frequency equal to the frequency of said second signal so that when the voltage level of the external signal is equal to the desired voltage level, the first and second signals have equal frequencies.

11. A method for synchronizing the phase of at least first and second external signals of an external power source that includes a mechanism for adjusting the relative phase of the first and second external signals, comprising:
mixing the first and second external signals to produce a mixed signal;
producing an indicator signal having a frequency that is proportional to the RMS voltage level of the mixed signal; and
adjusting the relative phases of the first and second signals until the frequency of the indicator signal is maximized, thereby indicating that the phases of the first and second signals are synchronized.

12. The method of claim 11 wherein the step of producing an indicator signal comprises producing an audible signal having a frequency in the hearing range that is proportional to the RMS voltage level of the mixed signal.

13. A signal monitoring instrument for use in adjusting the playback and record voltage levels and the tape head azimuth of a tape deck having inputs, outputs for outputting playback signals, a multi-track record head connected to the inputs, a multi-track playback head connected to the outputs, an adjustment mechanism for adjusting the azimuth of the record and playback heads, and an adjustment mechanism for adjusting the playback and record voltage levels, said instrument comprising:
an instrument input for being connected to the tape deck outputs for receiving at least a first playback signal;
a rectifier connected to said instrument input for receiving the playback signal and for producing a rectified signal having a voltage level equal to the RMS voltage level of the playback signal;
a voltage controlled oscillator connected to the rectifier and being responsive to the rectified signal to produce a first oscillator signal that is directly proportional in frequency to the voltage level of the rectified signal;
a reference oscillator for producing a reference oscillator signal;
a first mixer for receiving and mixing the first oscillator signal and the reference oscillator signal to produce a first mixed signal;
indicator means responsive to the first mixed signal for producing an indicator signal when the first oscillator signal and the reference oscillator signal have equal frequencies.

14. The instrument of claim 13 wherein said indicator means comprises:
an amplifier connected to receive the mixed signal for producing an amplifier signal corresponding to the mixed signal;
an audio speaker for receiving and being driven by the amplified signal to produce an audible sound having first and second tones corresponding in frequency to the frequencies of the first oscillator signal and the reference oscillator, respectively, said audio speaker being operable to produce a beat sound when the frequency difference between the first and second tones is less than a predetermined amount so that the playback signal may be adjusted to a desired voltage level by adjusting the playback voltage level until the beat is eliminated from the audible sound.

15. The instrument of claim 13 further comprising:
a precision DC voltage source for producing a precision DC signal;
a switch for disconnecting said rectifier from said input and for connecting said rectifier to said precision DC voltage source to receive the precision DC signal;
an adjustable DC offset circuit connected to receive the rectified signal and to produce an adjusted rectified signal, said voltage controlled oscillator being connected to the rectifier through said adjustable DC offset circuit so that said voltage controlled oscillator receives the adjusted rectified signal and produced the first oscillator signal at a frequency corresponding to the adjusted rectified signal, said adjustable DC offset being adjustable to produce an adjusted rectified signal that controls said voltage controlled oscillator to produce a first oscillator signal of the same frequency as the reference oscillator signal when the precision DC signal is applied through said switch to said rectifier.

16. The instrument of claim 13 further comprising:
an output oscillator for producing an output oscillator signal;
means for adjusting the voltage level of the output oscillator signal;
means for adjusting the frequency of the output oscillator signal;
an oscillator switch for connecting said output oscillator to the instrument input to apply the output oscillator signal thereto so that said output oscillator may be adjusted to produce an output oscillator signal at a voltage level that, when applied to said instrument input, will cause said voltage controlled oscillator to produce a first oscillator signal at the same frequency as the reference oscillator signal; and
an instrument oscillator output for outputting said output oscillator signal.

17. The instrument of claim 13 further comprising:
a second instrument input connected to the tape recorder outputs for receiving a second playback signal;
a second mixer having first and second inputs connected to said first and second instrument inputs, respectively, for producing a second mixed signal in response to the first and second playback signals;
an azimuth switch for disconnecting said first input from said rectifier and for connecting said rectifier to receive the second mixed signal and for disconnecting the reference oscillator signal from said first mixer so that said first mixer produces a first mixed signal that is generally identical to the first oscillator signal; and
said indicator means being responsive to the first mixed signal for producing an indicator signal that is proportional in frequency to the frequency of the first mixed signal, whereby the frequency of the indicator signal is proportional to the phase synchronization of the first and second playback signals when the playback signals are of the same frequency.

18. The instrument of claim 15 further comprising:
a comparator having a first input connected to receive the precision DC reference signal and having a second input connected to receive the rectified signal for producing a comparison signal when the rectified signal has a voltage level equal to the voltage level of the precision DC reference signal; and
an indicator responsive to the comparison signal for indicating when the rectified signal has a voltage level equal to the voltage level of the precision DC reference signal.

19. A method for adjusting the playback voltage level of a tape recorder to a desired voltage level using a test tape having a tone recorded thereon at a preselected magnetic flux density, comprising:
playing the test tape in the tape recorder to produce a playback signal at the output of the tape recorder;

producing a first signal having a frequency proportional to the RMS voltage level of the playback signal;

producing a second signal having a frequency that corresponds to the desired voltage level;

comparing the first and second signals and producing a comparison signal corresponding to the difference in frequencies between the first and second signals;

adjusting the RMS voltage level of the playback signal until the comparison signal indicates that the first and second signals are of the same frequency.

20. The method of claim 19 wherein the step of comparing the first and second signals comprises:

mixing the first and second signals to produce a mixed signal corresponding to the sum of the first and second signals;

producing an audible sound corresponding to the mixed signal so that said audible sound includes first and second tones that will produce a beat sound corresponding to the frequency difference between said first and second tones when the frequency difference is within a predetermined range;

adjusting the voltage level of the playback signal until said first and second tones are of the same frequency and the beat sound by the first and second tones has a zero frequency.

21. A method for adjusting the azimuth of a multi-track playback head on a multi-track tape recorder having outputs connected to the playback head and using a multi-track test tape having a tone of a selected monaural frequency recorded on at least first and second tracks of the test tape, comprising:

playing the test tape on the tape recorder to produce at least first and second playback signals at the outputs of the tape recorder, said first and second playback signals corresponding to the tones recorded on the first and second tracks, respectively, of the test tape;

mixing the first and second playback signals to produce a first mixed signal corresponding to the sum of the first and second playback signals;

producing an audible sound corresponding in frequency to the mixed signal;

adjusting the azimuth of the playback head to a position that maximizes the frequency of the audible sound.

* * * * *